(12) United States Patent
Higgins (10) Patent No.: US 7,454,037 B2
(45) Date of Patent: Nov. 18, 2008

(54) SYSTEM, METHOD AND COMPUTER PROGRAM PRODUCT FOR ADAPTIVE VIDEO PROCESSING

(75) Inventor: Robert P. Higgins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 586 days.

(21) Appl. No.: 11/256,012

(22) Filed: Oct. 21, 2005

(65) Prior Publication Data

US 2007/0092143 A1   Apr. 26, 2007

(51) Int. Cl.
*G06K 9/00* (2006.01)
*G01C 21/00* (2006.01)
*H04N 5/225* (2006.01)

(52) U.S. Cl. .................. 382/103; 701/200; 348/169
(58) Field of Classification Search ................. 382/103, 382/104, 107, 181, 228, 305, 307, 312; 707/3, 707/6; 701/3, 23, 200; 348/169
See application file for complete search history.

(56) References Cited

U.S. PATENT DOCUMENTS 6,724,915 B1 *  4/2004  Toklu et al. .................. 382/103
7,383,254 B2 *  6/2008  Wen et al. ........................ 707/3

OTHER PUBLICATIONS

Piciarelli C. et al. (Toward event recognition using trajectory analysis and prediction), pp. 131-134, IEEE, 2005.*
Ram Nevatia, Jerry Hobbs, Bob Bolles; *An Ontology for Video Event Representation*; 2004; 10 pages.
Ram Nevatia, Tao Zhao, Somboon Hongeng; *Hierarchial Language-based Representation of Events in Video Streams*; 2003; 8 pages.
Chuan Wu, Yu-Fei Ma, Hong-Jiang Zhang, Yu-Zhuo Zhong; *Events Recognition by Semantic Interference for Sports Video*; 2002; pp. 805-808; IEEE.
Ahmet Ekin, A. Murat Tekalp; Rajiv Mehrotra; *Extraction of Semantic Description of Events Using Bayesian Networks*; 2001; pp. 1585-1588; IEEE.
Somboom Hongeng, Ramakant Nevatia; *Large-Scale Event Deteection Using Semi-Hidden Markov Models*; Proceedings of the Ninth IEEE International Conference on Computer Vision; 2003; 8 pages; IEEE Computer Society.
Yi Li, Linda G. Shapiro; *Object Recognition for content-Based Image Retrieval*; 2004; 19 pages.

* cited by examiner

*Primary Examiner*—Kanji Patel
(74) *Attorney, Agent, or Firm*—Alston & Bird LLP (57) ABSTRACT

A method for adaptive video processing includes identifying an object in a frame of video data, determining an object confidence value associated with the identified object, and determining if the object confidence value meets a predefined threshold object confidence value. If not, the method can further include repeatedly processing the frame of video data with additional processing algorithms, and again identifying the object, determining an updated object confidence value, and determining if the updated object confidence value meets the predefined threshold object confidence value, until the updated object confidence value meets the predefined threshold object confidence value. Thereafter, an event can be identified based upon the identified object and an object primitive defining a relationship between the identified object and one or more other objects in the frame of video data, where the events can be identified in accordance with a hierarchical event structure.

24 Claims, 6 Drawing Sheets

| Parent Node(s) | | | Sequence | | | |
|---|---|---|---|---|---|---|
| Enter | Exit | S0 | | Entered | Exited | bar charts |
| Yes | Yes | Init | 1.0 | 0.0 | 0.0 | |
| | | Entered | 0.0 | 1.0 | 0.0 | |
| | | Exited | 0.0 | 0.0 | 1.0 | |
| | No | Init | 0.005 | 0.99 | 0.005 | |
| | | Entered | 0.0 | 1.0 | 0.0 | |
| | | Exited | 0.005 | 0.99 | 0.005 | |
| No | Yes | Init | 1.0 | 0.0 | 0.0 | |
| | | Entered | 0.005 | 0.005 | 0.99 | |
| | | Exited | 0.0 | 0.0 | 1.0 | |
| | No | Init | 1.0 | 0.0 | 0.0 | |
| | | Entered | 0.0 | 1.0 | 0.0 | |
| | | Exited | 0.0 | 0.0 | 1.0 | |

FIG. 7.

SYSTEM, METHOD AND COMPUTER PROGRAM PRODUCT FOR ADAPTIVE VIDEO PROCESSING

FIELD OF THE INVENTION

The present invention relates generally to systems and methods for processing video for object and/or event recognition and, more particularly, to systems and methods for adaptive processing video for object and/or event recognition.

BACKGROUND OF THE INVENTION

In many industries, it is often desirable to extract meaningful information from a video sequence to provide an understanding of the objects that appear in the video, as well as any events occurring based upon those objects. In the military, for example, vehicles such as unmanned aerial vehicles (UAVs) or other remotely piloted vehicles, autonomous airborne vehicles or the like, may carry video cameras for repeatedly imaging a scene proximate the vehicles to perform intelligence and surveillance activities. In this regard, imaging such a scene permits an operator to view the scene (e.g., terrain, etc.), any objects within the scene (e.g., vehicles, people, roads, buildings, etc.), and any activities of those objects (e.g., blocking a road, crossing a bridge, loading cargo, etc.). Conventionally, an operator is required to view the video from the vehicle to provide the understanding of what is present and what is happening in the scene. That understanding, then, can be forwarded to others to thereby provide those interested with awareness of the situation in the scene.

As will be appreciated, then, increasing use of vehicles for surveillance may conventionally require larger numbers of operators. Additionally, during periods of high video activity, an operator can become overloaded, and not be able to track all of the activity that might be of importance. An automated system for processing video to extract the intelligence information can reduce the load on the operators, potentially allowing a single operator to handle multiple vehicles.

One particularly interesting application of vehicle surveillance with an automated situation and event recognition capability is convoy surveillance. In such an application, a small vehicle, such as a ScanEagle UAV, can be directed to fly cover surveillance for a convoy. Elements of the convoy, as well as any other vehicles proximate the convoy, can then be detected and tracked. In addition, the planned convoy route can be searched ahead of the convoy to look for threats. An assessment of the threat to the convoy can then be made and provided to the convoy commander. This assessment can be based on the location, and activities of other vehicles in the vicinity of the convoy, and the presence or absence of obstacles or unusual activity along the planned convoy route. Automated event processing can provide the input to the threat assessment process.

Systems and methods have been developed for video processing, such as in the context of automated video surveillance to assist an operator in analyzing and processing surveillance video. As will be appreciated, however, it is generally desirable to improve upon existing systems and methods, including those for video processing.

SUMMARY OF THE INVENTION

In view of the foregoing background, exemplary embodiments of the present invention provide an improved system, method and computer program product for video processing. In accordance with exemplary embodiments of the present invention, when the recognition or identification confidence of an object or event is below a threshold, video or other data can be further processed in a manner that facilitates an increase confidence in the identification of the object or event. Increasing confidence in the object or event identification, then, can improve overall performance of the system of exemplary embodiments of the present invention in understanding the objects in a video, and the events that may be occurring with respect to those objects. In addition, exemplary embodiments of the present invention may provide a hierarchical structure for identifying events based upon identified objects such that lower-level events can be identified based upon relationship primitives defining relationships between objects. Higher-level events, then, can be identified based upon combinations of lower-level events, alone or in further combination with relationship primitives.

In accordance with one aspect of the present invention, a method is provided for adaptive video processing. The method includes identifying an object in a frame of video data, determining an object recognition confidence value associated with the identified object, and determining if the object confidence value meets a predefined threshold object confidence value. If the object confidence value does not meet the predefined threshold object confidence value, the method can further include repeatedly processing the frame of video data, and again identifying the object, determining an updated object confidence value associated with the object, and determining if the updated object confidence value meets the predefined threshold object confidence value. In this regard, a processing algorithm, such as a super-resolution algorithm and/or blur reduction algorithm, can be selected based upon the object confidence value, an operating parameter of an image source capable of providing the frame of video data and/or a complex system within which the image source is capable of operating, and/or data related to a context within which the image source is capable of operating to provide the frame. The frame can then be processed in accordance with the selected processing algorithm.

The frame processing and updated identification and confidence value determination can continue until the updated object confidence value meets the predefined threshold object confidence value, or until no further additional processing can be identified. Thereafter, an event can be identified based upon the identified object and an object primitive defining a relationship between the identified object and one or more other objects in the frame of video data, such as by processing a Bayesian network. In this regard, the event can be identified as a change in the relationship between the identified object and the other object(s) over a period of time, and can be identified in accordance with a hierarchical event structure. In this regard, a lower-level event can be identified based upon the identified object and an object primitive. Thereafter, higher-level events can be identified based upon the identified object and the identified lower-level event. In various instances, a plurality of objects and at least one event can be identified, where the objects include a number of the same type of object. In such instances, a separate Bayesian network can be processed for each object of the same type. Thus, exemplary embodiments of the present invention can be capable of simultaneously processing multiple events of the same type, at the same time.

Similar to the object, the method can further include determining an event confidence value associated with the identified event, and determining if the event confidence value meets a predefined threshold event confidence value. If the event confidence value does not meet the predefined threshold event confidence value, then, the method can include repeatedly processing frames of video data, such as in the manner above, and/or repeatedly processing object data from which the object primitive is capable of being determined. The event can then again be identified, an updated event confidence value associated with the event can be determined, and a determination can be made as to whether the updated event confidence value meets the predefined threshold event confidence value until the updated event confidence value meets the predefined threshold event confidence value, or no further additional processing can be identified. Thereafter, the identified event can be output.

According to other aspects of the present invention, a method and a computer program product are provided for adaptive video processing.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
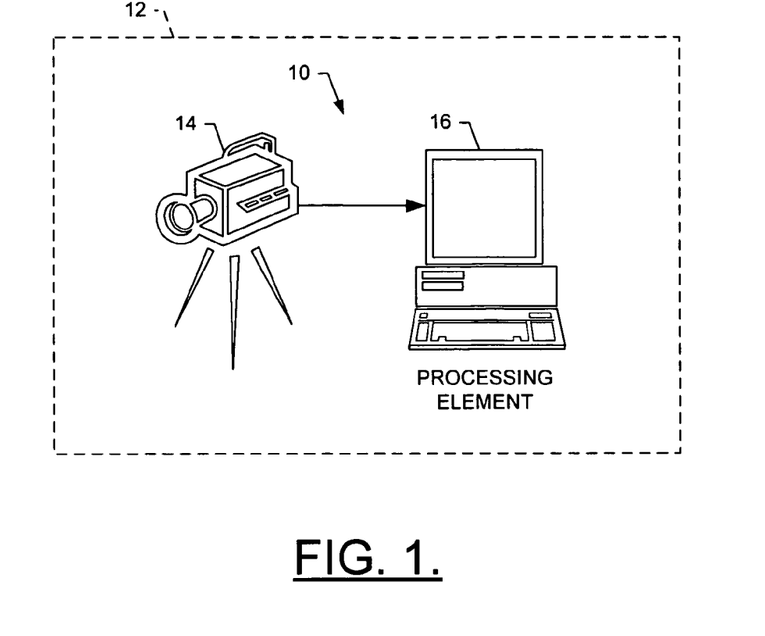
FIG. 1 is a schematic block diagram of a system for adaptive video processing in accordance with one embodiment of the present invention.

Referring to FIG. 1, an adaptive video processing system 10 is shown, in accordance with exemplary embodiments of the present invention. At the outset, it is important to note that although the system may be implemented in any of a number of different manners, the system of exemplary embodiments of the present invention may be implemented within a complex system 12. In this regard, all or a portion of the adaptive video processing system may be resident in a system such as an aircraft or other vehicle (e.g.; spacecraft, rocket, ship, land vehicle, amphibious vehicle, etc.), a building, a factory, or in any other packages, structures or environment. As a more particular example, and as suggested above, the system of exemplary embodiments of the present invention may be implemented to process video during operation of an unmanned aerial vehicle (UAV).

As shown, the video processing system 10 includes an image source 14 and a processing element 16. The image source can comprise any of a number of different entities capable of providing a plurality of images of a scene (referred to as "video data") that may include one or more objects. For example, the image source can comprise an image capture device (e.g., video camera), a video cassette recorder (VCR), DVD player, a video file stored in memory, or the like. The image source can be capable of providing data, including the video data and, if so desired, data related to the image source, to the processing element. Like the image source, the processing element can comprise any of a number of different entities capable of processing data from the image source and, if so desired, the complex system 12 within which the video processing system may be resident, as explained below. For example, the processing element can comprise any of a number of different entities capable of identifying or otherwise recognizing one or more objects and/or events from the video data, and thus within the imaged scene provided by the image source.

Figure 2:
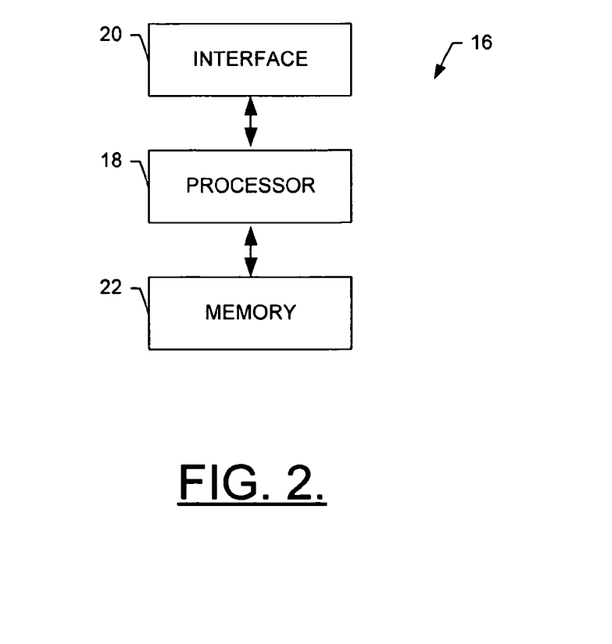
FIG. 2 is a schematic block diagram of a processing element in accordance with one embodiment of the present invention.

Referring now to FIG. 2, a block diagram of an entity capable of operating as a processing element 16 is shown in accordance with one embodiment of the present invention. As shown, the processing element can generally include one or more processors 18 to at least one interface 20, including at least one communication interface or other means for transmitting and/or receiving data, content or the like between the processing element and entities external to the video processing system. In addition, the interface(s) can include at least one user interface or other means for receiving and/or presenting data, content or the like from or to a user of the video processing system. Such user interfaces may include, for example, a keyboard or other keypad, a mouse or other pointing device, and/or a monitor or other display.

In addition to the interface(s) 20, the processor(s) 18 of the processing element 16 can be coupled to memory 22. The memory can comprise volatile and/or non-volatile memory, and typically stores content, data or the like. For example, the memory typically stores software applications, instructions or the like for the processor(s) to perform steps associated with operation of the processing element in accordance with embodiments of the present invention. As explained below, for example, the memory can store one or more databases including video data from the image source 14. The database (s) can also include data representative of known objects and/or events within video data capable of being provided by the image source, and/or the probabilities of those objects and/or events being so provided. Also, for example, the database(s) can include objects and/or events identified or otherwise recognized from video data. In addition, for example, the memory can store a database of thresholds for use in performing various functions of the processing element, such as to identify an imaged event and/or determine if further processing is necessary to increase confidence values associated with identified objects and/or events. Further, for example, the memory can store a database of data, such as meta-data, from the image source and/or complex system 12. Such data may include, for example, operating parameters of the image source (e.g., pan, tilt, zoom, etc. of the image capture device that imaged the respective scene), and/or complex system (e.g., UAV velocity, position, attitude, etc.).

As will be appreciated, the objects and/or events that may be expected to be identified from an imaged scene may differ based upon the complex system 12 within which the video processing system 10 is operated, and/or the environment within which the complex system and thus the video processing system is operated. For example, when the video processing system is resident within a UAV flying over a body of water, the video processing system may be expected to identify watercraft (relatively high probability—e.g., probability at or above a threshold—of identifying a watercraft), but not identify a land vehicle (relatively low probability—e.g., probably at or below a threshold—of identifying a land vehicle). Thus, whereas the database(s) in memory 22 of the processing element 16 can be configured to store any of a number of different known objects and/or events, and/or thresholds for use by the processing element, the database(s) of one exemplary embodiment can be configured for the particular complex system and/or environment within which the video processing system is being or will be operated. Thus, before operation, one or more sets of database(s) can be configured for respective complex system(s) and/or environment(s). When the video processing system is resident on a UAV or other aircraft, for example, sets of database(s) can be configured for environments such as desert, marine, air field environments, or the like. The sets of database(s) configured for these different environments, then, may be referred to as context database(s) that may be selected prior to operation of the video processing system.

Figure 3:
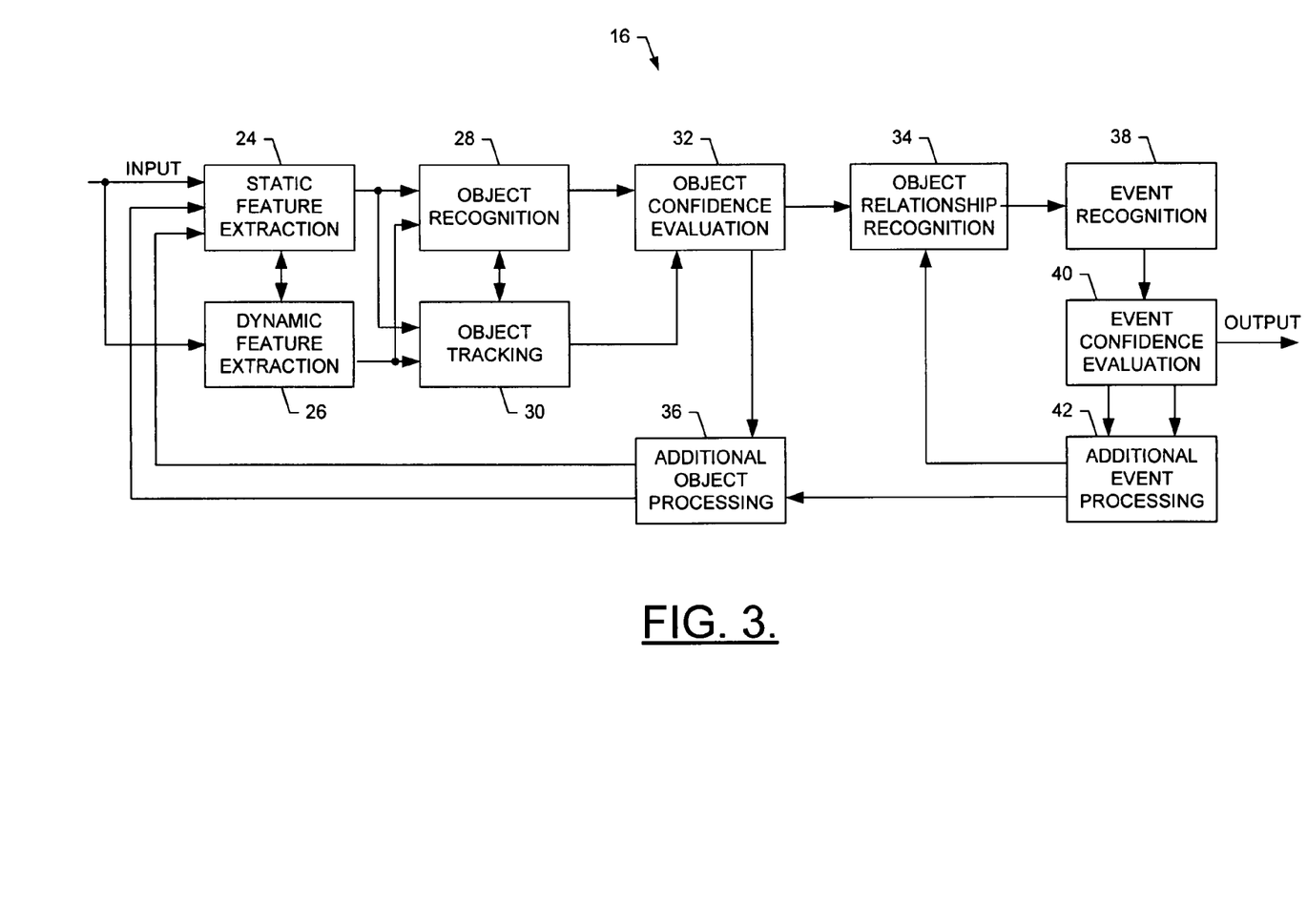
FIG. 3 is a functional block diagram of a processing element in accordance with one embodiment of the present invention.
Figure 4A:
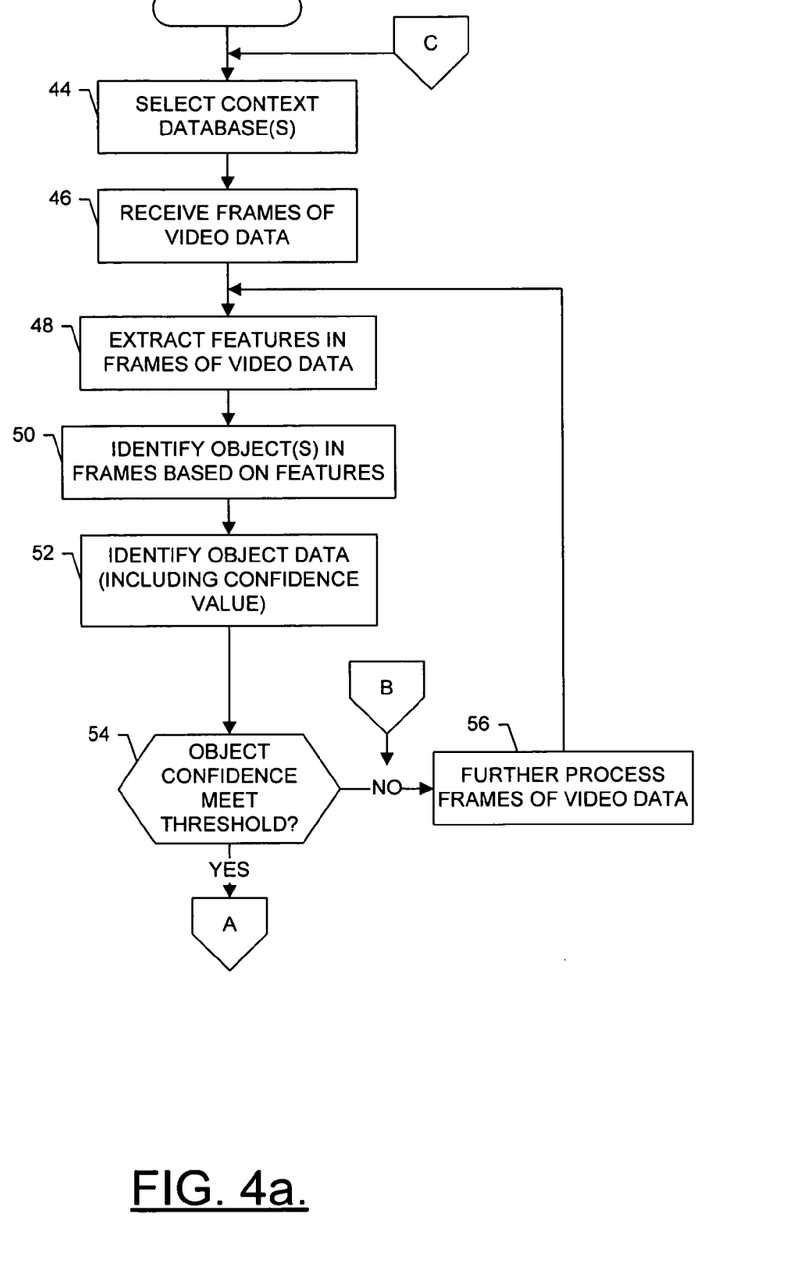
FIGS. 4a and 4b are flowcharts including various steps in a method of adaptive video processing, in accordance with one embodiment of the present invention.
Figure 4B:
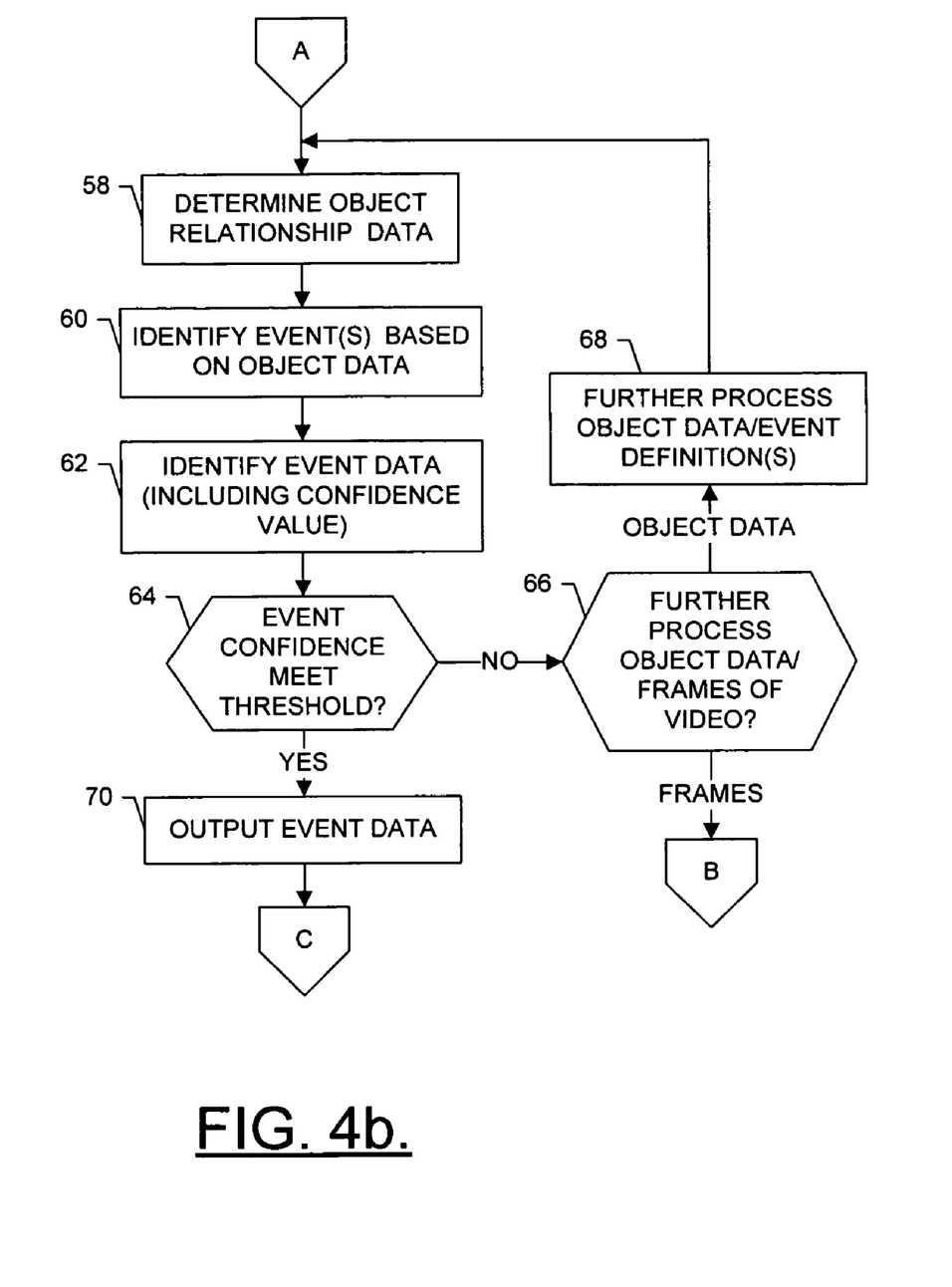

Reference is now made to FIGS. 3, 4a and 4b, which illustrate a functional block diagram and flowcharts of a processing element 16 and a method of adaptive video processing, respectively, in accordance with exemplary embodiments of the present invention. As shown, the processing element and flowcharts include a number of blocks (sometimes referred to as "processing portions") or steps for performing the functions of the processing element in the method of adaptive video processing. It should be understood that the blocks or steps may be implemented by various means, such as hardware and/or firmware, including those described above. In such instances, the hardware and/or firmware may implement respective blocks or steps alone and/or under control of one or more computer program products. In this regard, such computer program product(s) can include at least one computer-readable storage medium (e.g., memory 22) and software including computer-readable program code portions, such as a series of computer instructions, embodied in the computer-readable storage medium.

As shown in FIG. 3, the processing element 16 can include static and dynamic feature extraction blocks (processing portions) 24, 26, as well as an object recognition block (processing portion) 28. In this regard, during operation of the video processing system 10, the feature extraction blocks can be capable of receiving video data (including a plurality of frames) from the image source 14. Before operating the video processing system, however, the database(s) in memory 22 of the processing element can be configured for the particular complex system 12 and/or environment within which the video processing system is being or will be operated, such as by selecting a particular set of context database(s), as shown in block 44 of FIG. 4a. The feature extraction blocks can thereafter receive a plurality of frames of video data from the image source, as shown in block 46.

The video data can be formatted in any of a number of different manners including, for example, uncompressed AVI (Audio Video Interleaved) file format, MPEG (Moving Picture Experts Group) file format, or the like. Irrespective of the video data format, the feature extraction blocks 24, 26 can extract and output information relating to one or more features present in one or more frames of video data, as shown in block 48. As will be appreciated, the feature extraction blocks can extract feature information from frame(s) of video data in accordance with any of a number of different techniques. For example, the feature extract blocks can extract feature information in accordance with techniques such as a shape feature descriptor algorithm, the Shape Invariant Feature Transform (SIFT) algorithm or the like. For more information on the SIFT algorithm, see David G. Lowe, *Distinctive Image Features from Scale-Invariant Keypoints*, 60(2) INT'L J. COMPUTER VISION 91-110 (2004).

As object feature(s) are extracted, the feature extraction blocks 24, 26 can be capable of generating, determining and/or receiving one or more pieces of data related to object(s) that may be later identified based upon those feature(s), as also shown in block 48. As explained herein, in various instances identifying data may refer to one or more of generating, determining and/or receiving data. For example, the dynamic feature extraction block can determine object data such as a velocity (e.g., magnitude and direction) of the respective object. In addition, due to motion of the complex system 12, and accordingly the image capture device 14, the dynamic feature extraction block can determine an estimate of global motion of the frame sequence, which can then be output for more accurately determining one or more of other pieces of object data.

As will be appreciated, complex systems 12 such as vehicles (e.g., UAVs) are mobile platforms such that, during operation of the complex system and video processing system 10, the image source 14 may be moving relative to the imaged scene provided thereby. Accordingly, it may be necessary or otherwise desirable to track the global image motion in order to determine the relative positions and velocities of one or more identified objects. The dynamic feature extraction 26 block can therefore determine the global image motion in any of a number of different manners, but in accordance with one exemplary embodiment, an initial global motion can be determined as an affine parameter model to thereby provide estimates of the translation, rotation, and scale changes between frames in the frame sequence. The dynamic feature extraction block can then integrate along the frame sequence to thereby produce a referenced set of images for event determination (explained below), although some additional processing may be necessary or otherwise required to maintain a reasonable reference.

Irrespective of how the feature extraction blocks 24, 26 extract feature information from frame(s) of video data from the image source 14, or the pieces of object data identified thereby, the feature information can be provided to the object recognition block 28. In response, the object recognition block can function as a classifier for identifying or otherwise recognizing one or more objects within frame(s) of video data, and thus the corresponding imaged scene provided by the image source, based upon the feature information, as shown in block 50. Like the feature extraction blocks, the object recognition block can identify object(s) within frame(s) of video data in accordance with any of a number of different techniques. If an object has the feature of motion relative, for example, the object recognition block can identify the object from objects, such as vehicles, persons or the like, capable of moving, as opposed to from objects, such as buildings, roads or the like, that are less (if at all) likely to move. Also, for example, if an object as the feature of green color in the context of the adaptive video processing system 10 operating a system such as an aircraft, the object recognition block can identify the object from objects, such as fields, forests or the like, more likely to have a green color, as opposed to from objects, such as buildings, bodies of water or the like, that are less (if at all) likely to have such a color.

Further, for example, in identifying roads, the object recognition block may search for features such as ribbons, long smooth sets of parallel edges where the region bounded by the edges has a consistent color and/or texture. In the case of recognizing buildings, for example, the object recognition block may search for long smooth edges connected in polygon shapes.

As object(s) are identified, the object recognition block 28 can be capable of generating, determining and/or receiving one or more pieces of additional data related to those object(s), as shown in block 52. For example, the object recognition block can be capable of generating an object identifier (ID), and/or determining a time (e.g., frame number) and/or location (e.g., X, Y coordinates) at which the respective object appeared at the imaged scene or otherwise in the frame data. Also, for example, the object recognition block can be capable of determining one or more attributes of the respective object, such as a size (e.g., major, minor axes of an ellipse confined to a region of the frame corresponding to the object), orientation (e.g., angle of major axis relative to frame horizontal), color (e.g., RGB mean and/or covariance of the pixels contained within the respective frame region), texture (e.g., mean—e.g., 12D Gabor coefficients—and/or covariance—e.g., nine values), shape (e.g., polygon contours of the respective frame region), structure, and/or one or more optional object attributes that may be unique to the respective object or object type.

The object recognition block 28 can also be capable of determining an object type attribute, such as based upon a comparison of one or more of the other object attributes with similar attributes of known objects stored in memory 22 of the processing element. Further based upon such a comparison, the object recognition block can be capable of determining a confidence value associated with the respective object, as also shown in block 52. In this regard, the confidence value can relate to the probability that the object recognition block correctly identified the object, or more particularly the object type, based upon the comparison of the determined object attribute(s) and known object attribute(s).

Regardless of the generated, determined and/or received object data, the object recognition block 28 can output one or more pieces of such object data to an object tracking block (processing portion) 30 and an object confidence evaluation block (processing portion) 32. The object tracking block, which can also receive feature information from the feature extraction blocks 24, 26, is capable of tracking the position of the identified object throughout its appearance in a sequence frames of video data. In this regard, the object tracking block can maintain the identity of an identified object through a sequence of video data frames. For example, the object tracking block may determine that a particular object identified in frame 33 is the same object identified in frame 2, or a different object than that identified in frame 2. Based upon such a determination, the object tracking block can track the object IDs assigned to various objects throughout a sequence of frames, including when an object leaves the imaged scene and later returns.

As the object tracking block 30 tracks the positions of identified objects, object data can be output to the object confidence evaluation block 32. The object confidence evaluation block, in turn, is capable of determining if the object confidence value meets a predefined threshold object confidence value, such as based upon a comparison of the object confidence value and the threshold object confidence value, as shown in block 54. If the object recognition confidence value is at least as high as the threshold object confidence value, the object confidence evaluation block can output one or more of the pieces of object data to an object relation recognition block (processing portion) 34 for further processing, and/or an object database in memory 22 of the processing element 16 (not shown in FIG. 3). Otherwise, if the object recognition confidence value is less than the threshold object confidence value, the object confidence evaluation block can direct an additional object processing block (processing portion) 36 to perform additional processing of the frames of video data from which the object was identified. By further processing the frames of video data, the additional object processing block is capable of facilitating an increase in the recognition confidence value for objects identified based upon the original video data and those identified based upon the processed video data.

In response to receiving the pieces of object data, the additional object processing block 36 is capable of further processing the frames of video data, as shown in block 56. The frames can be further processed in accordance with any one or more of a number of different techniques, which may be selected in any of a number of different manners. For example, the frames can be further processed in accordance with a super-resolution technique or algorithm capable of increasing the resolution of the frames, and/or a blur reduction technique or algorithm capable of reducing, if not removing, blur from the frames that may have been introduced by motion of the image source 14 and/or imaged object. Also, for example, the techniques with which the frames are further processed can be selected based upon the confidence value, context-related data, and/or operating parameters of the image source and/or complex system (e.g., meta-data) in database(s) in memory 22 of the processing element 16.

For example, presume that the system 10 is operating within an aircraft (complex system 12), and the object recognition block 28 identifies an object as a vehicle, but with low recognition confidence level (as determined by the object confidence evaluation block 32). In such an instance, the additional object processing block can examine the determined size attribute of the object. Then, the additional object processing block can determine the expected size of the identified vehicle based upon data representative of a known vehicle, and based upon data (e.g., meta-data) from the image source 14 and/or the aircraft, such as the altitude of the aircraft, and/or the pointing angle and/or lens focal length of the image capture device that imaged the object. If the determined size of the object is approximately the same as or smaller than the expected size, the additional object processing block can select a super-resolution algorithm to further process the frames of data, thereby increasing the resolution of the respective frames.

Irrespective of the selection of additional processing techniques, after processing the frames of video data, the additional object processing block 36 can output the processed video data back to the feature extraction blocks 24, 26. The feature extraction blocks, as well as the object recognition and tracking blocks 28, 30 can then operate upon the processed video data in much the same manner as the original video data (see blocks 48, 50 and 52). In this regard, the object recognition and tracking blocks 28 can determine updated or otherwise update the pieces of data related to the object(s) including the recognition confidence value, with the additional processing of the frames having facilitated an increase in the confidence value for objects identified based upon the original video data and those identified based upon the processed video data. The object confidence evaluation block 32 can then again determine if the updated object confidence value meets the predefined threshold object confidence value (see block 54). If not, the object confidence evaluation block can output one or more of the pieces of object data to the additional object processing block 36 which, together with the feature extraction blocks, object recognition and tracking blocks and object confidence evaluation block, can operate as before until the updated object confidence value meets the predefined threshold object confidence value, or no further additional processing can be identified.

If or when the object confidence value meets the predefined threshold object confidence value, the object confidence evaluation block 32 is capable of outputting one or more pieces of object data to the object relationship recognition block 34. The relationship recognition block is capable of determining additional object data related to spatial relationships between the respective objects and other identified objects, as shown in block 58 of FIG. 4b. More particularly, for each of one or more objects, the relationship recognition block is capable of determining, as additional object data, one or more other objects (e.g., object IDs) having a relationship with the object. In addition, the relationship recognition block can determine other object data including, for example, the distance(s) between the object and the other object(s), the direction(s) of the object with respect to the other object(s), and one or more primitives or states defining the relationship between the object and the other object(s). The relationship primitives can comprise any of a number of different primitives defining the relationship between an object and other object(s) in any of a number of different manners. For example, the relationship primitives can include one or more of the following: inside-of, outside-of, behind (object view point), ahead (object view point), right-of (object view point), left-of (object view point), above, below, closer (observer's view point), farther (observers view point), occluding (different levels of), and distance (near, far).

Figure 5A:
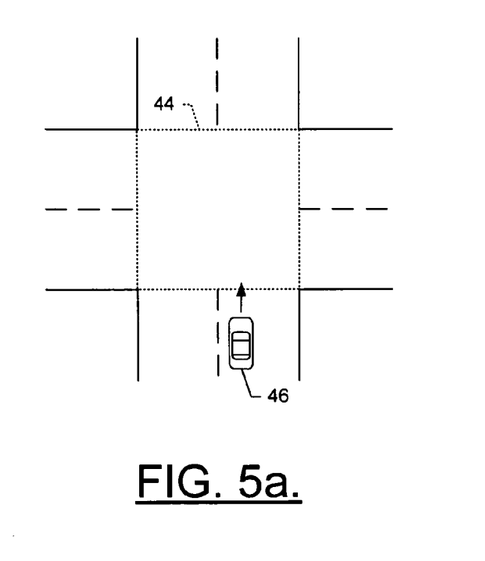
FIGS. 5a-5d are schematic illustrations of video data of an imaged scene including a vehicle turning left at an intersection, the vehicle and intersection being the identified objects within the video data, in accordance with one embodiment of the present invention.
Figure 5B:
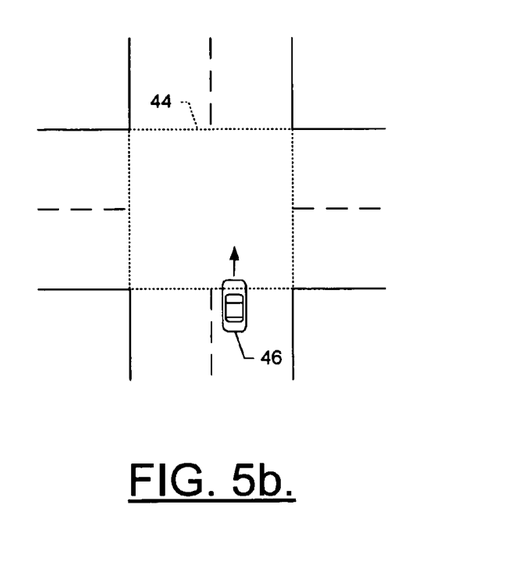
Figure 5C:
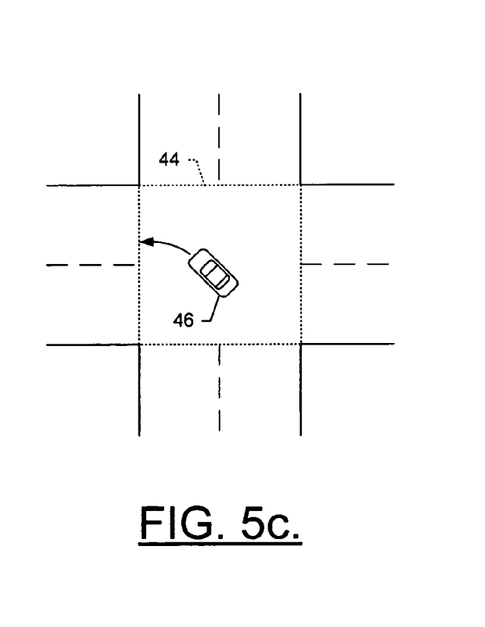
Figure 5D:
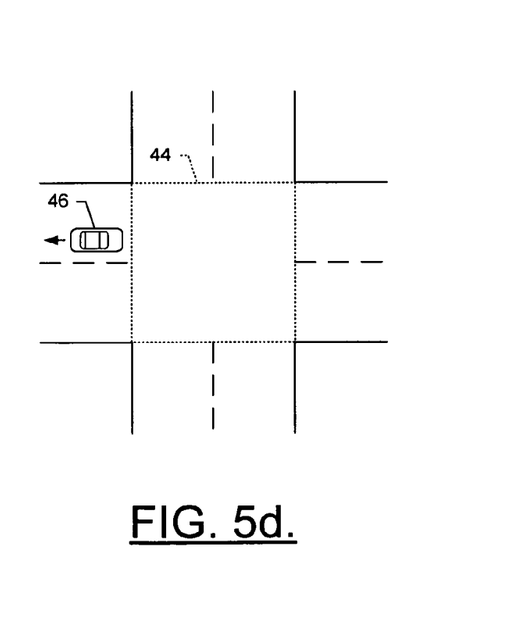

The object relation recognition block 34 can determine primitives or states defining the relationship between an object and other object(s) in any of a number of different manners. As an example, consider video data of an imaged scene including a vehicle 44 turning left at an intersection 46, the vehicle and intersection being the identified objects within the video data, as shown in FIGS. 5a-5d. In such an instance, for example, the object relation recognition block can determine the primitive "outside-of" defining the relationship between the vehicle and the intersection when the regions of the vehicle and the intersection do not overlap, as shown in FIGS. 5a and 5d. Similarly, for example, the object relation recognition block can determine the primitive "inside-of" defining the relationship between the vehicle and the intersection when the regions of the vehicle and the intersection first overlap, as shown in FIGS. 5b and 5c. In this regard, FIGS. 5b and 5c show different possible definitions of the relationship "inside-of." For instance, FIGS. 5b and 5c illustrate instances where the relationship "inside-of" is characterized by the regions barely overlapping (FIG. 5b), and or characterized by the region of the vehicle is completely contained within the region of the intersection (FIG. 5c). When the same relationship can be defined in different manners, such as in the case of "inside-of," different event definitions may require the different definitions, which can be accommodated by providing different names to the different relationships (e.g., "inside-of-1" and "inside-of-2"). Much as there can be different variations of "inside-of," spatial relationships may require a point of view, thereby resulting in multiple variations of right, left, etc. Right or left can then be seen from the point of view of an object, or from the point of view of the image source 14 of the video processing system 10. As will be appreciated, the first point of view may require knowledge of the orientation of the object (vehicle), while the second point of view may not require such knowledge.

Irrespective of exactly how the object relation recognition block 34 determines primitives for identified objects, the object relation recognition block can thereafter output one or more pieces of object data, including the data related to spatial relationships between the respective objects and other identified objects, to an event recognition block 38. The event recognition block can then identify or otherwise recognize one or more events based upon the objects and their spatial relationship, as shown in block 60. In this regard, an event may be identified as a change in the relationship between two objects over a period of time (or over a number of frames of video data). A known event can be stored in a database of known events in memory 22 of the processing element 16, and defined in any of a number of different manners. Similar to the primitives explained above, for example, known events can be defined in accordance with any of a number of different manners. In this regard, events can be defined in accordance with a hierarchical event structure where simpler events can be based upon object primitives, and more complex events can be based upon combinations of simpler, lower-level events, alone or in further combination with object primitives.

Again consider video data of an imaged scene including a vehicle 44 turning left at an intersection 46, the vehicle and intersection being the identified objects within the video data, as shown in FIGS. 5a-5d. In such an instance, a definition of a known turn-left event can be stored in a database in memory 22 of the processing element 16, and represented as follows:

```
PROCESS(turn-left-at-intersection(vehicle x, intersection y),
    AND(
        E1: SEQUENCE(
            E2: enter(vehicle x, intersection y),
            E3: exit(vehicle x, intersection y)),
        same(
            velocity(vehicle x, v1.dir, at-time(E2)),
            velocity(vehicle x, v2.dir+p/2, at-time(E3))),
        less-than(duration(E1),threshold)))
```

In the above definition, the event involves the logical AND of three conditions. The first condition can be a sequence in time of the vehicle entering the intersection, followed by the vehicle exiting the intersection. The second condition can require the direction of the vehicle's velocity vector when the vehicle exits the intersection to be 90° greater (p/2 in the definition representing π/2 radians=90°) than the velocity vector when the vehicle entered the intersection (left turn). The third condition can be that the duration of the sequence occurs in less than some threshold length of time since, as the length of time from when the vehicle enters the intersection to when it leaves increases, there is an increasing likelihood of some other event occurring, such as "vehicle blocking the intersection" rather than the "turn left at intersection". As will be appreciated, the vehicle entering and exiting the intersection conditions can be defined in terms of lower-level events "enter" and "exit", which can be separately defined. In this regard, the enter event can be represented as follows:

```
PROCESS(enter(entity x, region y),
    change(
        outside-of(entity x, region y),
        inside-of(entity x, region y)))
```

Therefore, to recognize the turn-left event, it may be necessary to recognize the vehicle and intersection objects, as well as the primitive relationships of "inside-of" and "outside-of," from the video data.

The event recognition block 38 can identify the event(s) in any of a number of different manners, including via Bayesian networks, hidden Markov models (HMMs), neural networks or the like. More particularly, event(s) of one embodiment of the present invention are identified based upon a Bayesian network that is capable of being updated. See, for example, S. L. Lauritzen et al., *Local Computations with Probabilities on Graphical Structures and Their Applications to Expert Systems*, JOURNAL OF THE ROYAL STATISTICAL SOCIETY B, VOL. 50, pp. 157-224 (1988) for a more detailed discussion of the Bayesian probability update algorithm. The general approach to constructing a Bayesian network for event identification/recognition is to map known events to the determined or otherwise identified lower-level event(s) and/or primitives that form the basis of those known events. The construction of a Bayesian network may require the creation of nodes with collectively exhaustive, mutually exclusive discrete states, and influence arcs connecting the nodes in instances in which a relationship exists between the nodes, such as in instances in which the state of a first node, i.e., the parent node, effects the state of a second node, i.e., the child node. Also, in a Bayesian network, a probability can be associated with each state of a child node (i.e., a node dependent upon another node), and as such, the probability of each state of a child node can be conditioned upon the respective probability associated with each state of each respective parent node.

Accordingly, when the event recognition block identifies event(s) based upon a Bayesian network, the primitive object data of an object can more particularly comprise one or more primitives that are each associated with a probability of the primitive being true for the respective object. Consider, for example, the spatial relationships of "ahead-of" and "behind." For a vehicle traveling in front of another vehicle, the primitive "ahead-of" can be determined and associated with the probability 1.0. If the two vehicles are traveling side by side, however, the primitives "ahead-of" and "behind" can be determined with each being associated with the probability 0.5. When one of the vehicles moves from "behind" to "ahead-of" the other, then, a Gaussian cumulative distribution function (CDF) can be implemented, with the width of the transition region (variance of the Gaussian) capable of being related to the signal-to-noise ratio (SNR) of the position measurement.

Figure 6:
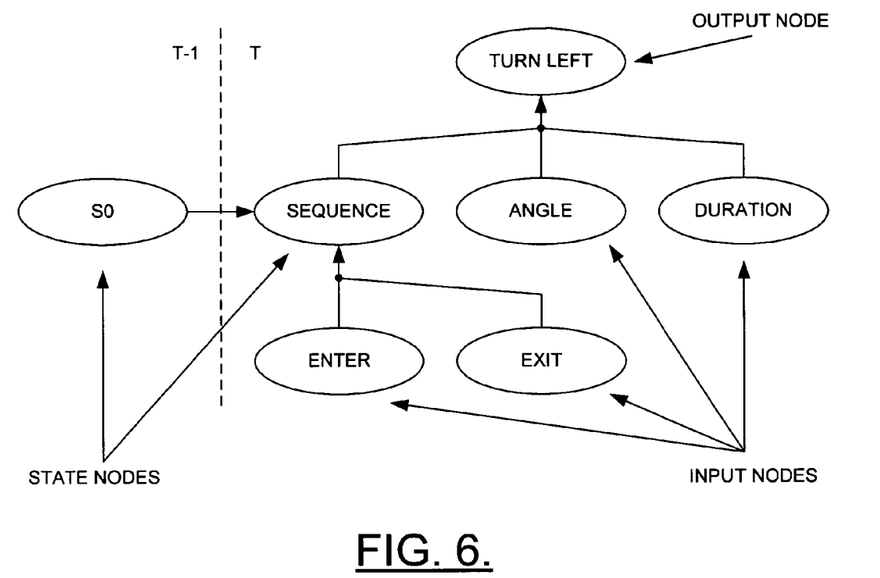
FIG. 6 is a portion of a Bayesian network for identifying an event in accordance with one exemplary embodiment of the present invention.
Figure 7:
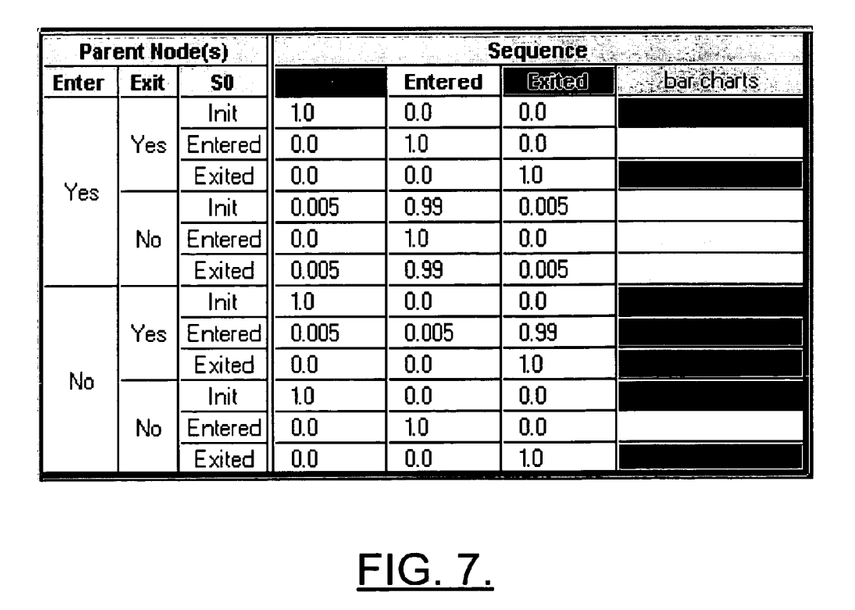
FIG. 7 is a conditional probability table for a sequence state of the network of FIG. 6.

Continuing the above turn-left exemplary event, FIG. 6 illustrates at least a portion of a Bayesian network for such an event. As shown, the network includes input nodes for the "enter" and "exit" events, the angle difference between "enter" and "exit" events, and the duration of the sequence, where the angle difference and duration inputs may be undefined until the completion of the sequence. As also shown, the network includes an output node for the turn-left event (labeled "TurnLeft"). As will be appreciated, the sequence node and an S0 node can be noted as state nodes that keep track of the sequence state that is part of the event definition. The sequence node comprises a multi-state node having states of initialized, entered, and exited. The sequence node, then, can be set to the initialized state at start up, and thereafter selectively modified to the entered and exited states based upon the enter and exit input nodes, as well as the memory state S0. In this regard, node S0 can represent the value of the sequence at the previous interval, thereby providing a manner of updateability to the network. However, the S0 and sequence nodes may not be updated at every time step (frame), but rather in response to a change in the enter and exit input nodes. FIG. 7 illustrates a conditional probability table for the sequence state of the network of FIG. 6.

As indicated above, a second condition of the turn-left event may be that difference of the vehicle's velocity vector direction between the "enter" and "exit" events is 90°. As will be appreciated, however, not all left turns are exactly 90°. The implementation for the angle difference, then, can have a three-state output where the angular range has been divided into "mid," "edge," and "outside." In such instances, for example, the "mid," "edge," and "outside" states can be more particularly defined as follows (with reference to the difference of the vehicle's velocity vector direction):

$155°>\text{mid}>25°$ $(25°>\text{edge}>10°) \cup (170°>\text{edge}>155°)$ $10°>\text{outside}>170°$ As shown, the "mid" state can have the highest conditional probability, with the "edge" state having the next highest conditional probability, and the "outside" state having a conditional probability at or approaching 0.0 for a left turn.

As events can represent a change in the relationship between multiple objects, the event recognition block 38 can be configured to process a Bayesian network for an event in response to identification of a respective lower-level event or more particularly a change in a primitive upon which the respective lower-level event is based, or in response to a change occurring in a respective primitive. For example, the event recognition block can be configured to process the turn-left event in response to identification of an "enter" or "exit" lower-level event with respect to the vehicle and intersection, where the "enter" and "exit" events are in turn processed in response to a change in the primitive "inside-of." The vehicle can move around getting closer or further away from the intersection, with a change in the state of "inside-of" triggering the event recognition block to process the turn-left event.

The system 10 can be configured to identify multiple event types for multiple different types of objects by processing a different Bayesian network for each type of event. In addition, the system can be configured to identify multiple events for multiple objects of the same type. In such instances, the event recognition block 38 can be configured to process those different objects with the same Bayesian network. Alternatively, the event recognition block can be configured to simultaneously process a separate Bayesian network for each object of the same type. In such instances, the event recognition architecture can be capable of handling simultaneous events involving the same or different objects. As an event is associated with particular objects, multiple simultaneous and overlapping events can be easily processed by the event recognition block. In the case of multiple vehicles on a road or at an intersection, for example, the event recognition block can be configured to process the events involving the different vehicles independently from one another. In this regard, one vehicle can cross the intersection and a second can turn at the intersection at the same time or with overlapping durations.

To further illustrate processing of multiple simultaneous and overlapping events, consider that from the formal definition of an event, an event may have an assigned name and reference the objects that participate in that event. Also consider that an event process may be configured to be initiated only in response to some evidence that that event may occur (e.g., object primitives, lower-level events, etc.). Continuing the above example, the event recognition block 38 may be configured to instantiate and process a left-turn event only in response to evidence of and enter lower-level event. In order to have an enter event, there has to be at least a pair of objects (e.g., vehicle and intersection). Upon recognizing or otherwise identifying an enter event, the object types of the enter event can be compared to the object types required for a turn-left event, vehicle and intersection. The object IDs of the particular vehicle and the intersection associated with the enter event can then be recorded as part of the turn-left event, as can the enter event confidence value. Such a turn-left event instance can be associated with only those particular objects, or more particularly those particular object IDs.

Thereafter, when an exit lower-level event is identified, the object types and IDs can be compared against those of the existing turn-left event process. If the object types and IDs match, the event processing can continue. Should another enter event be identified, that other event involving a different vehicle and/or different intersection, the different object ID(s) can trigger the event recognition block 38 to instantiate and process another left-turn event with those unique ID(s). Thus, exemplary embodiments of the present invention can be configured to simultaneously process multiple instances of the turn-left event, with each being associated with the IDs of their respective component objects.

As event(s) are identified, the event recognition block 38 can be capable of generating, determining and/or receiving (identifying) one or more pieces of data related to those event(s), as shown in block 62. For example, the event recognition block can be capable of identifying the event name, generating an event identifier (ID), and/or determining a start time (e.g., frame number) and/or duration of the event (e.g., frame range). Also, for example, the event recognition block can be capable of determining one or more attributes of the respective event, such as the objects (e.g., object IDs) that participated in the event and, if desired, one or more pieces of data related to those objects (e.g., object type), and/or one or more optional event attributes that may be unique to the respective event. Further, the event recognition block can be capable of determining a confidence value associated with the respective event, such as based upon the Bayesian network processed to identify the event, as also shown in block 62. Similar to the object confidence value, the event confidence value can relate to the probability that the event recognition block correctly identified the event, or more particularly the event name.

Regardless of the identified, generated, determined and/or received object data, the event recognition block 38 can output one or more pieces of such event data to an event confidence evaluation block (processing portion) 40. The event confidence evaluation block, in turn, is capable of determining if the event confidence value meets a predefined threshold event confidence value, such as based upon a comparison of the event confidence value and the threshold event confidence value, as shown in block 64. If the event confidence value is at least as high as the threshold event confidence value, the event confidence evaluation block can output one or more of the pieces of event data to an event database in memory 22 of the processing element 16 and/or another internal or external entity (not shown in FIG. 3). Otherwise, if the event confidence value is less than the threshold event confidence value, the event confidence evaluation block can direct an additional event processing block (processing portion) 42 to perform or direct performance of additional event processing. The additional event processing can include any one or more of a number of different processing configured to facilitate an increase in the event confidence value, including further processing object data and/or frames of video data, as shown in block 66. In this regard, the additional event processing may include additional processing of one or more pieces of object data from which the object relation recognition block 34 is capable of determining spatial relationships between identified objects, and/or reconfiguring the objects, primitives and/or lower-level events that define an event, as shown in block 68. For example, object primitives such as "near" and "far" require associated thresholds, or even fuzzy thresholds that have a probability density function, to define the respective primitives. In such instances, a particular event may be defined by an object being "near" another object. As the definition of an object being considered "near" may be context sensitive, additional processing at the object relationship recognition block 34 may include adjusting the threshold associated with the "near" primitive based on the conditions of the particular event and event context.

Additionally or alternatively, the additional event processing may include additional processing of the frames of video data from which the respective object participants were identified, such as in the same manner as the additional object processing block 36 (see block 56 of FIG. 4a). In such instances, the object confidence may have been high enough to pass the first gate of the object recognition confidence threshold (at the object confidence evaluation block 32), but lower than might otherwise be required in some instances of an event recognition task. Alternately, frames of video data may be further processed to obtain one or more further object parameters that may not otherwise be required.

Similar to before, the techniques by which the object data and/or frame(s) of video data are further processed can be selected in any of a number of different manners. For example, the techniques with which the object data and/or frame(s) of video data is further processed can be selected based upon the event confidence value, context-related data, and/or operating parameters of the image source 14 and/or complex system 12 (e.g., meta-data) in database(s) in memory 22 of the processing element 16. More particularly, for example, the additional event processing block 42 can determine which of the input evidence values having a more significant impact on the low event recognition confidence, whether an identified object, object primitive, lower-level event or the like. That input evidence value can then be re-examined in the appropriate manner, such as by further processing the frames of video data if an identified object has a more significant impact on the low event recognition confidence value, reconfiguring identified primitives and/or lower-level events when those evidence values have a more significant impact on the low event recognition confidence value.

The additional event processing block 42 can determine the evidence value having a more significant impact on the low event recognition confidence in a number of different manners, such as based upon use of Bayesian networks in the event recognition. In this regard, Bayesian networks can be processed in both the forward and reverse directions. In the basic event recognition, the event recognition block 38 can identify events by processing in the forward direction from the evidence to the conclusion. To determine the evidence value having a more significant impact, however, the Bayesian network can be processed in reverse (inference). In such instances, the event recognition output can be set to a high confidence value, such as by setting the output probability to 1.0 (high confidence that the identified event is true). It should be understood, however, that the process described herein may be equally applied when setting the output probability to 0.0 (high confidence that the identified event is false).

After setting the output to a high confidence value, the Bayesian network can then be processed in reverse to determine which of the input evidence values has a significant change from their evidence value. By selecting an input evidence value, and setting the remaining input evidence values to their actual evidence values, the amount of change in the selected evidence value that would be required to increase the event output probability of 1.0 can be determined. This process can be repeated for each input evidence value to determine which evidence value has the greatest impact on the output event confidence value. This evidence input can then be reexamined relative to the particular event and context to determine if confidence in the respective evidence input can be increased, thereby increasing the event confidence.

Irrespective of the selection of additional processing techniques, when a technique is selected for processing object data, the additional event processing block 42 can accordingly process the object data and output the processed object data back to the object relation recognition block 34, or alternatively direct the object relation recognition block to process the object data. When a technique is selected for processing frame(s) of video data, on the other hand, the additional event processing block can accordingly process the frame(s), or direct the additional object processing block 36 to process the frame(s). The processed frame(s) can then be output back to the feature extraction blocks 24, 26. The feature extraction blocks, as well as the object recognition and tracking blocks 28, 30 can then operate upon the processed video data in much the same manner as the original video data. In this regard, the object recognition and tracking blocks can determine updated or otherwise update one or more pieces of object data. Then, presuming the updated object confidence value again meets the predefined threshold object confidence value, the object confidence evaluation block 32 can output the processed object data to the object relation recognition block.

Irrespective of exactly where the object relation recognition block 34 receives updated object data, the object relation recognition block, as well as the event recognition block 38, can then operate upon the processed object data in much the same manner as the original object data. In this regard, the object relation and event recognition blocks can determine updated or otherwise update the spatial relationship data, including object primitives, and identify one or more event(s) based upon such updated object data (see blocks 60 and 62). In addition, the event recognition block can determine an updated or otherwise update the event confidence value for the respective event(s), with the additional processing of the object data having facilitated an increase in the respective event confidence value for events identified based upon the original object data and those identified based upon the processed object data. The event confidence evaluation block 40 can then again determine if the updated event confidence value meets the predefined threshold event confidence value (see block 64). If not, the event confidence evaluation block can output one or more of the pieces of event data to the additional event processing block 42 which, together with the other aforementioned blocks of the processing element 16, can operate as before until the updated event confidence value meets the predefined threshold event confidence value, or no further additional processing can be defined. If or when the event confidence value meets the predefined threshold event confidence value, then, the event confidence evaluation block is capable of outputting one or more pieces of event data to the event database in memory 22 of the processing element 16 and/or another internal or external entity, as shown in block 70. For example, the event confidence evaluation block can be capable of outputting event data to an alerting entity internal or external to the processing element when a predefined event is identified, the alerting entity thereby being triggered to generate an alert or notification to a user.

As indicated above, according to one aspect of the present invention, the system 10 of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. The computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

In this regard, FIGS. 4a and 4b are flowcharts of methods, systems and program products according to exemplary embodiments of the present invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed, they are used in a generic and descriptive sense only and not for purposes of limitation.

That which is claimed:

1. A processing element for adaptive video processing, the processing element comprising:
   a first processing portion capable of identifying an object in a frame of video data;
   a second processing portion capable of determining an object confidence value associated with the identified object;
   a third processing portion capable of determining if the object confidence value meets a predefined threshold object confidence value;
   a fourth processing portion capable of repeatedly processing the frame of video data when the object confidence value does not meet the predefined threshold object confidence value, wherein the fourth processing portion is capable of outputting the processed frame of video data such that the first, second and third processing portions are capable of repeatedly identifying the object, determining an updated object confidence value associated with the object, and determining if the updated object confidence value meets the predefined threshold object confidence value until the updated object confidence value meets the predefined threshold object confidence value; and
   a fifth processing portion capable of identifying an event based upon the identified object and an object primitive defining a relationship between the identified object and one or more other objects in the frame of video data, wherein the event is capable of being identified as a change in the relationship between the identified object and the other objects over a period of time, and wherein the event is capable of being identified in accordance with a hierarchical event structure.

2. A processing element according to claim 1, wherein the fourth processing portion is capable of processing the frame by:
   selecting a processing algorithm based upon at least one of the object confidence value, an operating parameter of at least one of an image source capable of providing the frame of video data or a complex system within which the image source is capable of operating to provide the frame, or data related to a context within which the image source is capable of operating to provide the frame; and
   processing the frame in accordance with the selected processing algorithm.

3. A processing element according to claim 2, wherein the fourth processing portion is capable of selecting at least one of a super-resolution algorithm, or a blur reduction algorithm.

4. A processing element according to claim 1 further comprising:
   a sixth processing portion capable of determining an event confidence value associated with the identified event;
   a seventh processing portion capable of determining if the event confidence value meets a predefined threshold event confidence value;
   an eighth processing portion capable of at least one of repeatedly processing object data from which the object primitive is capable of being determined, or repeatedly directing the fourth processing portion to process the frame of video data, when the event confidence value does not meet the predefined threshold event confidence value, the at least one of object data or frame being processed such that the fifth, sixth and seventh processing portions are capable of repeatedly identifying the event, determining an updated event confidence value associated with the event, and determining if the updated event confidence value meets the predefined threshold event confidence value until the updated event confidence value meets the predefined threshold event confidence value, and
   wherein the seventh processing portion is thereafter capable of outputting the identified event.

5. A processing element according to claim 4, wherein the eighth processing portion is capable of processing object data by:
   selecting a processing algorithm based upon at least one of the object confidence value, an operating parameter of at least one of an image source capable of providing the frame of video data or a complex system within which the image source is capable of operating to provide the frame, or data related to a context within which the image source device is capable of operating to provide the frame; and
   processing the object data in accordance with the selected processing algorithm.

6. A processing element according to claim 1, wherein the event comprises a higher-level event, and wherein the fifth processing portion is capable of identifying a lower-level event based upon the identified object and an object primitive, and thereafter identifying the higher-level event based upon the identified object and the identified lower-level event.

7. A processing element according to claim 1, wherein the fifth processing portion is capable of processing a Bayesian network for the event to thereby identify the event.

8. A processing element according to claim 7, wherein the first and fifth processing portions are capable of identifying a plurality of objects and at least one event, the plurality of objects comprise a plurality of a same type of object, and wherein the fifth processing portion is capable of processing a separate Bayesian network for each object of the same type.

9. A method for processing video data, the method comprising:
   identifying an object in a frame of video data;
   determining an object confidence value associated with the identified object;
   determining if the object confidence value meets a predefined threshold object confidence value, wherein when the object confidence value does not meet the predefined threshold object confidence value, the method further comprises repeatedly:
   processing the frame of video data; and
   identifying the object, determining an updated object confidence value associated with the object, and determining if the updated object confidence value meets the predefined threshold object confidence value until the updated object confidence value meets the predefined threshold object confidence value; and thereafter,
   identifying an event based upon the identified object and an object primitive defining a relationship between the identified object and one or more other objects in the frame of video data, wherein the event is capable of being identified as a change in the relationship between the identified object and the other objects over a period of time, and wherein the event is capable of being identified in accordance with a hierarchical event structure.

10. A method according to claim 9, wherein the processing step comprises:
    selecting a processing algorithm based upon at least one of the object confidence value, an operating parameter of at least one of an image source capable of providing the frame of video data or a complex system within which the image source is capable of operating to provide the frame, or data related to a context within which the image source is capable of operating to provide the frame; and processing the frame in accordance with the selected processing algorithm.

11. A method according to claim 10, wherein the selecting step comprises selecting at least one of a super-resolution algorithm, or a blur reduction algorithm.

12. A method according to claim 9 further comprising:
determining an event confidence value associated with the identified event;
determining if the event confidence value meets a predefined threshold event confidence value,
wherein when the event confidence value does not meet the predefined threshold event confidence value, the method further comprises repeatedly:
processing at least one of the frame of video data or object data from which the object primitive is capable of being determined; and
repeatedly identifying the event, determining an updated event confidence value associated with the event, and determining if the updated event confidence value meets the predefined threshold event confidence value until the updated event confidence value meets the predefined threshold event confidence value; and thereafter,
outputting the identified event.

13. A method according to claim 12, wherein the processing at least one of the frame of video data or object data step comprises:
selecting a processing algorithm based upon at least one of the object confidence value, an operating parameter of at least one of an image source capable of providing the frame of video data or a complex system within which the image source is capable of operating to provide the frame, or data related to a context within which the image source is capable of operating to provide the frame; and
processing at least one of the frame of video data or object data in accordance with the selected processing algorithm.

14. A method according to claim 9, wherein the event comprises a higher-level event, and wherein the identifying an event step comprises:
identifying a lower-level event based upon the identified object and an object primitive; and thereafter,
identifying the higher-level event based upon the identified object and the identified lower-level event.

15. A method according to claim 9, wherein the identifying an event step comprises processing a Bayesian network for the event to thereby identify the event.

16. A method according to claim 15, wherein the identifying steps comprise identifying a plurality of objects and at least one event, the plurality of objects comprise a plurality of a same type of object, and wherein the processing a Bayesian network step comprises processing a separate Bayesian network for each object of the same type.

17. A computer program product for adaptive video processing, wherein the computer program product comprises at least one computer-readable storage medium having computer-readable program code portions stored therein, the computer-readable program code portions comprising:
a first executable portion for identifying an object in a frame of video data;
a second executable portion for determining an object confidence value associated with the identified object;
a third executable portion for determining if the object confidence value meets a predefined threshold object confidence value;
a fourth executable portion for repeatedly processing the frame of video data when the object confidence value does not meet the predefined threshold object confidence value, wherein the fourth executable portion is adapted to output the processed frame of video data such that the first, second and third executable portions are adapted to repeatedly identify the object, determine an updated object confidence value associated with the object, and determine if the updated object confidence value meets the predefined threshold object confidence value until the updated object confidence value meets the predefined threshold object confidence value; and
a fifth executable portion for identifying an event based upon the identified object and an object primitive defining a relationship between the identified object and one or more other objects in the frame of video data, wherein the event is capable of being identified as a change in the relationship between the identified object and the other objects over a period of time, and wherein the event is capable of being identified in accordance with a hierarchical event structure.

18. A computer program product according to claim 17, wherein the fourth executable portion is adapted to process the frame by:
selecting a processing algorithm based upon at least one of the object confidence value, an operating parameter of at least one of an image source capable of providing the frame of video data or a complex system within which the image source is capable of operating to provide the frame, or data related to a context within which the image source is capable of operating to provide the frame; and
processing the frame in accordance with the selected processing algorithm.

19. A computer program product according to claim 18, wherein the fourth executable portion is adapted to select at least one of a super-resolution algorithm, or a blur reduction algorithm.

20. A computer program product according to claim 17 further comprising:
a sixth executable portion for determining an event confidence value associated with the identified event;
a seventh executable portion for determining if the event confidence value meets a predefined threshold event confidence value;
an eighth executable portion for at least one of repeatedly processing object data from which the object primitive is capable of being determined, or directing the fourth executable portion to process the frame of video data, when the event confidence value does not meet the predefined threshold event confidence value, the at least one of object data or frame being processed such that the fifth, sixth and seventh executable portions are adapted to repeatedly identify the event, determine an updated event confidence value associated with the event, and determine if the updated event confidence value meets the predefined threshold event confidence value until the updated event confidence value meets the predefined threshold event confidence value, and
wherein the seventh executable portion is thereafter adapted to output the identified event.

21. A computer program product according to claim 20, wherein the eighth executable portion is adapted to process object data by:

selecting a processing algorithm based upon at least one of the object confidence value, an operating parameter of at least one of an image source capable of providing the frame of video data or a complex system within which the image source is capable of operating to provide the frame, or data related to a context within which the image source is capable of operating to provide the frame; and processing the object data in accordance with the selected processing algorithm.

22. A computer program product according to claim 17, wherein the event comprises a higher-level event, and wherein the fifth executable portion is adapted to identify a lower-level event based upon the identified object and an object primitive, and thereafter identify the higher-level event based upon the identified object and the identified lower-level event.

23. A computer program product according to claim 17, wherein the fifth executable portion is adapted to process a Bayesian network for the event to thereby identify the event.

24. A computer program product according to claim 23, wherein the first and fifth executable portions are adapted to identify a plurality of objects and at least one event, the plurality of objects comprise a plurality of a same type of object, and wherein the fifth executable portion is adapted to process a separate Bayesian network for each object of the same type.

* * * * *